(12) United States Patent
Park et al.

(10) Patent No.: US 10,412,611 B2
(45) Date of Patent: Sep. 10, 2019

(54) MOBILITY MANAGEMENT FOR HIGH-SPEED MOBILE USER EQUIPMENT

(71) Applicant: LG ELECTRONICS INC., Seoul (KR)

(72) Inventors: Kungmin Park, Seoul (KR); Jiwon Kang, Seoul (KR); Kitae Kim, Seoul (KR); Kilbom Lee, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 15/564,656

(22) PCT Filed: Aug. 5, 2015

(86) PCT No.: PCT/KR2015/008190
§ 371 (c)(1),
(2) Date: Oct. 5, 2017

(87) PCT Pub. No.: WO2016/163601
PCT Pub. Date: Oct. 13, 2016

(65) Prior Publication Data
US 2018/0077595 A1 Mar. 15, 2018

Related U.S. Application Data

(60) Provisional application No. 62/144,957, filed on Apr. 9, 2015, provisional application No. 62/143,784, filed on Apr. 6, 2015.

(51) Int. Cl.
*H04L 12/28* (2006.01)
*H04W 24/10* (2009.01)
(Continued)

(52) U.S. Cl.
CPC ........... *H04W 24/10* (2013.01); *H04L 5/0055* (2013.01); *H04W 8/02* (2013.01); *H04W 8/26* (2013.01);
(Continued)

(58) Field of Classification Search
CPC ....... H04W 8/26; H04W 16/28; H04W 24/10; H04W 36/30; H04W 72/085; H04W 88/02
(Continued)

(56) References Cited

U.S. PATENT DOCUMENTS

2004/0157646 A1* 8/2004 Raleigh ............... H01Q 3/2605
455/562.1
2006/0264184 A1 11/2006 Li et al.
(Continued)

FOREIGN PATENT DOCUMENTS

EP 2753127 A1 7/2014
JP 2002-232341 A 8/2002
(Continued)

*Primary Examiner* — John Pezzlo
(74) *Attorney, Agent, or Firm* — Dentons US LLP

(57) ABSTRACT

The present invention relates to a method for efficiently supporting communication for vehicles in a next-generation wireless communication system and a device for the same. To this end, a user equipment (UE) receives signals from a single antenna of a network through a plurality of antenna units which are located in dispersed locations of the UE, determines whether or not a mobility-related event of the UE has occurred by means of the signals received through the plurality of antenna units, and, if a mobility-related event of the UE has occurred, transmits an event occurrence report to the network, wherein the occurrence of the mobility-related event of the UE is determined in accordance with the Rx power of the signals and the radio wave distribution between the network and the UE and, more particularly, the angle of (Continued)

arrival (AoA) of the signals received through the plurality of antenna units.

8 Claims, 12 Drawing Sheets

(51) Int. Cl.
    *H04W 8/02*     (2009.01)
    *H04W 72/08*     (2009.01)
    *H04L 5/00*     (2006.01)
    *H04W 8/26*     (2009.01)
    *H04W 16/28*     (2009.01)
    *H04W 36/30*     (2009.01)
    *H04J 1/16*     (2006.01)
    *H04W 88/02*     (2009.01)
    *H04W 28/02*     (2009.01)

(52) U.S. Cl.
    CPC ........... *H04W 16/28* (2013.01); *H04W 36/30* (2013.01); *H04W 72/085* (2013.01); *H04W 28/0226* (2013.01); *H04W 88/02* (2013.01)

(58) Field of Classification Search
    USPC .......................................... 370/252, 329, 386
    See application file for complete search history.

(56) References Cited

U.S. PATENT DOCUMENTS

| | | |
|---|---|---|
| 2012/0088516 A1 | 4/2012 | Ji et al. |
| 2013/0059545 A1 | 3/2013 | Kyosti et al. |
| 2015/0230105 A1* | 8/2015 | Negus ................. H04B 7/0408 370/329 |
| 2016/0021650 A1 | 1/2016 | Chembil-Palat et al. |
| 2018/0367207 A1* | 12/2018 | Learned ................ H04W 24/08 |

FOREIGN PATENT DOCUMENTS

| | | |
|---|---|---|
| JP | 2003-304569 A | 10/2003 |
| KR | 10-2008-0070148 A | 7/2008 |
| KR | 10-2014-0054413 A | 5/2014 |
| KR | 10-2014-0135234 A | 11/2014 |
| WO | 2006/088984 A2 | 8/2006 |
| WO | 2014-027824 A1 | 2/2014 |
| WO | 2014-154293 A1 | 10/2014 |

* cited by examiner a) Measurement per sub-array    b) easurement per sub-array and per Tx port/beam a) AoD measurement per sub-array    b) AoD measurement per sub-array and per large gain Tx beam

MOBILITY MANAGEMENT FOR HIGH-SPEED MOBILE USER EQUIPMENT

This application is a 35 USC § 371 National Stage entry of International Application No. PCT/KR2015/008190, filed on Aug. 5, 2015, and claims priority to U.S. Provisional Application No. 62/143,784, filed Apr. 6, 2015, and U.S. Provisional Application No. 62/144,957, filed Apr. 9, 2015 all of which are incorporated by reference in their entirety herein.

TECHNICAL FIELD

The following description relates to a method and apparatus for efficiently managing mobility of high speed user equipment (UE) in a next-generation wireless communication system and, particularly, to a method and apparatus for efficiently providing mobility management to a UE for vehicles to which a distributed antenna array is applied.

BACKGROUND ART

In the conventional mobile communication system for mainly serving personal mobile communication devices, there is an inversely proportional relationship between the speed of the UE and required data rate and quality of service (QoS). As such, the conventional communication system is configured to provide high data rate/QoS for a low speed UE, and to provide reliable service without radio link failure for a high speed UE even if the data rate/QoS is somewhat low.

In a next generation communication system, there is a need for high data rate/QoS for the high speed UE, since the scope of the required service increases. For example, the users in the vehicle or public transportation would like to enjoy multimedia services during the drive on a highway. Also, users want to enjoy multimedia services more while the speed of the vehicle is high.

This is a new model which does not exist in conventional wireless communication service models. To support this, mobile communication networks need to be enhanced to a revolutionary level or a new system capable of realizing the new model without affecting network infrastructures needs to be designed.

In next-generation mobile communication systems, V2X (Vehicle-to-Infrastructure/Vehicle/Nomadic) communication technology for supporting efficient vehicle communion is under discussion. V2X communication includes communication between a vehicle and infrastructure (V2I) and communication between vehicles (V2V).

When a large antenna array is provided to the outside of a vehicle in order to provide a high quality communication service to high speed vehicles, aesthetic/aerodynamic problems are generated and thus research into vehicle antennas for replacing the large antenna array is required.

In addition, when an event that a signal of a serving cell decreases below a specific threshold value compared to neighboring cells in order to manage UE mobility occurs, a UE reports occurrence of the event to the serving cell for UE mobility management in a conventional technology. However, efficiency of application of this technology to vehicular communication needs to be examined.

DISCLOSURE

Technical Problem

An efficient UE mobility management method and a UE configuration therefor in order to support high-quality vehicular communication services will be described.

Technical Solution

In an aspect of the present invention to accomplish the aforementioned object, a method of performing, by a user equipment (UE), reporting for mobility management in a wireless communication system includes: receiving signals transmitted from a single antenna of a network through a plurality of antenna units located at distributed positions of the UE; determining, by a central unit of the UE, whether a mobility related event of the UE has occurred through the signals received by means of the plurality of antenna units; and transmitting an event occurrence report to the network when the mobility related event of the UE has occurred, wherein whether the mobility related event of the UE has occurred is determined in consideration of Rx power of the signals received through the plurality of antenna units and angles of arrival (AoA) of the signals received through the plurality of antenna units.

Here, determination may be made that link reliability with a specific network device of the network is proportional to the number of rays/beams received from the specific network device through the plurality of antenna units and an AoA difference between the rays/beams Here, the number of received ray/beams may be regarded as the number of beams having Rx power equal to or higher than a predetermined reference level among all received rays/beams.

Further, determination may be made that link reliability with the specific network device is proportional to the number of antenna units having a number of rays/beams and an AoA difference between the rays/beams, which are greater than appropriate levels, among the plurality of antenna units located at distributed positions of the UE.

In addition, link reliability with the specific network device may be determined on the basis of the number of antenna units having Rx power equal to or greater than a specific level and an AoA difference equal to or greater than a specific level among the plurality of antenna units.

Rx power of the signals received through the plurality of antenna units may be considered through at least one of Rx power or quality of a signal received by each of the plurality of antenna units from each network device of the network, Rx power or quality of all signals received by the plurality of antenna units from each network device of the network, Rx power or quality of each preferred received signal of each of plurality of antenna units from among signals received from each network device of the network, and Rx power or quality of all preferred received signals of each of the plurality of antenna units from among signals received from each network device of the network.

Further, different measurement durations may be set for respective parameters considered for determination of whether a mobility related event of the UE has occurred.

In addition, whether the mobility related event of the UE has occurred may be determined by independently determining whether a plurality of conditions is satisfied or may be determined in such a manner that, when a first condition of the plurality of conditions is satisfied, whether a second condition following the first condition is satisfied.

Further, the event occurrence report may include information about ray directivity from a specific network device of the network.

In addition, in the aforementioned embodiment, angles of departure (AoD) of signals transmitted from a network device may be additionally considered.

In another aspect of the present invention to accomplish the aforementioned object, a UE for which mobility management is supported in a wireless communication system includes: a plurality of antenna units located at distributed positions of the UE; and a central unit connected to the plurality of antenna units and configured to determine whether a mobility related event of the UE has occurred through signals received by means of the plurality of antenna units, wherein the plurality of antenna units is configured to receive signals transmitted through a single antenna of a network, and the central unit is configured to determine whether the mobility related event of the UE has occurred in consideration of Rx power of the signals received through the plurality of antenna units and ray distribution between the network and the UE, specifically, angles of arrival (AoA).

The central unit may determine that link reliability with a specific network device of the network is proportional to the number of rays/beams received from the specific network device through the plurality of antenna units and an AoA difference between the rays/beams. Here, the number of received ray/beams may be regarded as the number of beams having Rx power equal to or higher than a predetermined reference level among all received rays/beams.

In addition, link reliability with the specific network device may be determined on the basis of the number of antenna units having Rx power equal to or greater than a specific level and an AoA difference equal to or greater than a specific level among the plurality of antenna units.

The central unit may consider Rx power of the signals received through the plurality of antenna units through at least one of Rx power or quality of a signal received by each of the plurality of antenna units from each network device of the network, Rx power or quality of all signals received by the plurality of antenna units from each network device of the network, Rx power or quality of each preferred received signal of each of a plurality of antenna units from among signals received from each network device of the network, Rx power or quality of all preferred received signals of each of the plurality of antenna units from among signals received from each network device of the network, and the number of sub-arrays which receive a signal from each network device of the network with power equal to or higher than an appropriate level.

The central unit may set different measurement durations for respective parameters considered for determination of whether a mobility related event of the UE has occurred.

In addition, the central unit may additionally consider AoD in addition to the Rx power and AoA.

Advantageous Effects

According to above-described embodiments of the present invention, it is possible to provide communication services more stably in a high-speed movement environment such as vehicular communication.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method and apparatus for efficiently providing mobility management to a UE for vehicles to which a distributed antenna array is applied in a next-generation wireless communication system.

Distributed Antenna Array

As described above, a vehicular MIMO system in which a large size antenna array is installed in a vehicle such that a high-quality service can be provided to the vehicle through a large array gain even when the vehicle moves at a high speed, and a central unit of the vehicle relays received data to a passenger is considered in order to provide efficient vehicular communication.

When the large size antenna array is installed outside of the vehicle and radio communication is relayed between a base station and a passenger in the vehicle through the large size antenna array, communication performance deterioration due to penetration loss having an average value of about 20 dB can be prevented, a large array gain can be secured by using a larger number of Rx antennas than a personal mobile communication device, and a distance between Rx antennas can be easily secured to easily obtain Rx diversity.

According to the aforementioned features, vehicular MIMO can provide communication services superior to personal mobile devices without additional infrastructure investment Despite the above-described advantage, there is no example in which a large antenna array is installed in a vehicle. Since a vehicle is a considerably expensive apparatus compared to personal mobile communication devices, is difficult to enhance and upgrade, and needs to satisfy many requirements such as design concept, aerodynamic structure and the like in addition to communication performance, it is not easy to install the large antenna array which aesthetically/aerodynamically limits vehicle design. Vehicle manufacturers use a combined antenna having lower performance than a single antenna in order to eliminate visual inconvenience due to existing antennas.

Figure 1:
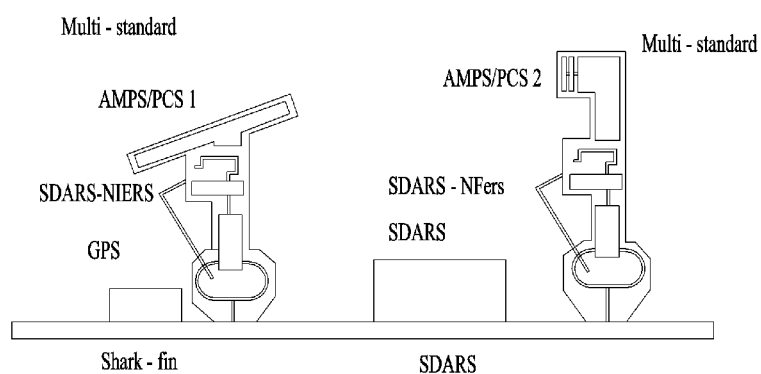
FIG. 1 shows a structure of a conventional shark antenna system for vehicular communication.

FIG. 1 shows a structure of conventional shark antenna system for vehicular communication.

In FIG. 1, the shark antenna includes combined structure for 4 or more different band/services in one antenna.

However, this shark antenna is a combined antenna having lower performance than a single antenna, which is used by vehicle manufacturers in order to eliminate visual inconvenience due to existing antennas, as described above, and thus is insufficient to provide high-quality vehicular communication.

Accordingly, one aspect of the present invention considers installation of a distributed antenna array system for realizing an arrayed antenna system through multiple arrays instead of a single array in a vehicle in order to overcome spatial restriction of a large array antenna.

Figure 2:
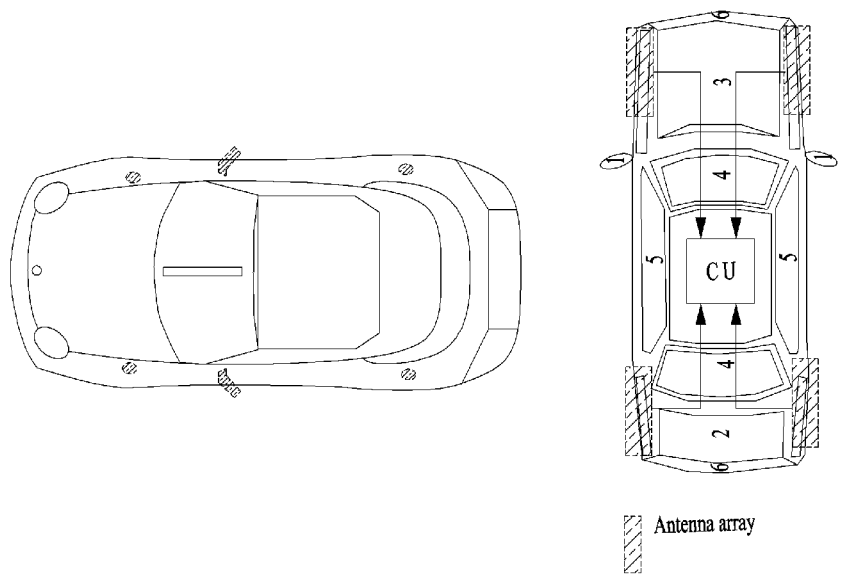
FIG. 2 shows a concept of an in-vehicle DAS system installed in a car.

FIG. 2 shows a concept of an in-vehicle DAS system installed in a car.

Antennas having various forms and emission patterns depending on installation positions are disposed at distributed positions, and a central unit for controlling transmission and reception of signals in an integrated manner through the antennas may be installed as shown in FIG. 2. According to this configuration, a reception (Rx) diversity gain can be maximized using the antenna array and a situation in which wireless connection between a base station and a vehicle receiver is interrupted during high-speed movement causing abrupt communication environment change can be prevented through cooperative reception of antennas having different emission patterns.

An antenna unit which is disposed in a distributed manner in a vehicle as illustrated in FIG. 2 may be called a "distributed unit" (DU) and will be referred to as "antenna sub-array" or "antenna unit" in the following description.

Figure 3:
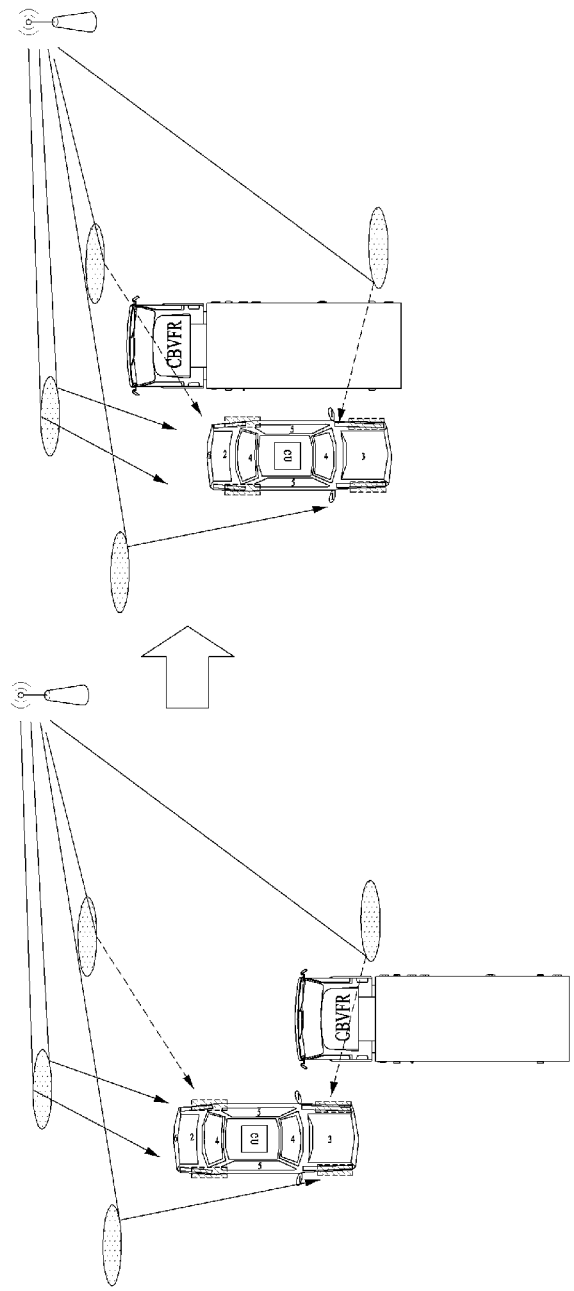
FIG. 3 schematically illustrates the reason why a distributed antenna system is more suitable to prevent link failure than conventional systems when ray-block is generated due to vehicle movement.

FIG. 3 schematically illustrates the reason why a distributed antenna system is more suitable to prevent link failure than conventional systems when ray-block is generated due to vehicle movement.

In vehicular communication, when an obstacle such as a truck moves at one side of a vehicle at a speed similar to that of the vehicle and thus a beam is received only in the direction in which the truck moves, communication failure may occur for a considerable time.

However, when the aforementioned distributed antenna system is applied as shown in FIG. 3, a beam received from a network device may have various paths and thus a problem that an obstacle moving at one side of a vehicle directly affects communication can be mitigated.

In FIG. 3, a network device which transmits signals to a UE for vehicles may be a conventional eNB or a roadside device installed for vehicular communication. In addition, signals from the network device may be directly received by the UE for vehicles or reflected by a specific reflector and received.

Problem of Current Cell Selection Method

As described above, the distributed array antenna is an array solution suitable for mobile communication for vehicles which can enhance Rx power gain by realizing a large array antenna and overcome communication performance deterioration and link failure during ray-block. However, to obtain an actual gain through the aforementioned antenna structure in a mobile communication system, an access control method appropriate for the antenna structure needs to be applied. A conventional access control method which mainly uses a personal mobile communication device using a single antenna array is an Rx power based access control method which relatively compares Rx powers of cell search reference signals transmitted from eNBs to select an eNB most suitable to provide services to each UE and does not provide abundant rays required to prevent performance deterioration due to ray-block and a function of comparing Rx diversity gains.

Figure 4:
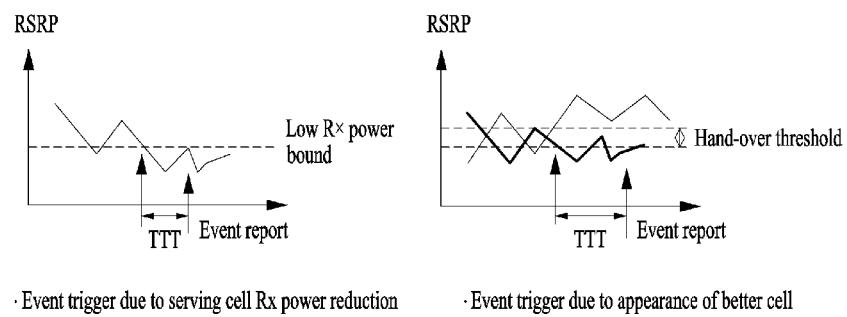
FIG. 4 illustrates conventional radio resource monitoring (RRM) for eNB/cell selection.

FIG. 4 illustrates a conventional radio resource monitoring (RRM) method for eNB/cell selection.

To request eNB/cell change from an eNB to which a UE is currently connected, an "event" indicating that eNB/cell change may be needed needs to be triggered. The event is triggered 1) when Rx power of a cell search reference signal of a serving cell decreases below an appropriate value and thus access point change to another eNB/cell needs to be considered, 2) when "a cell search reference signal of a cell other than the serving cell is received with higher power than the cell search reference signal of the serving cell for a predetermined time" and thus it is determined that an eNB/cell, which is more suitable to be used as an access point than the current serving cell, exists, or 3) when the aforementioned two situations simultaneously/sequentially occur.

When the event occurs, a network or a serving cell eNB may request that the UE measure and report more detailed channel state, perform/instruct serving cell change, or determine that the current serving cell is maintained in consideration of various network factors that are not recognized by the UE, such as traffic balancing.

Proposed Cell Selection Method

Figure 5:
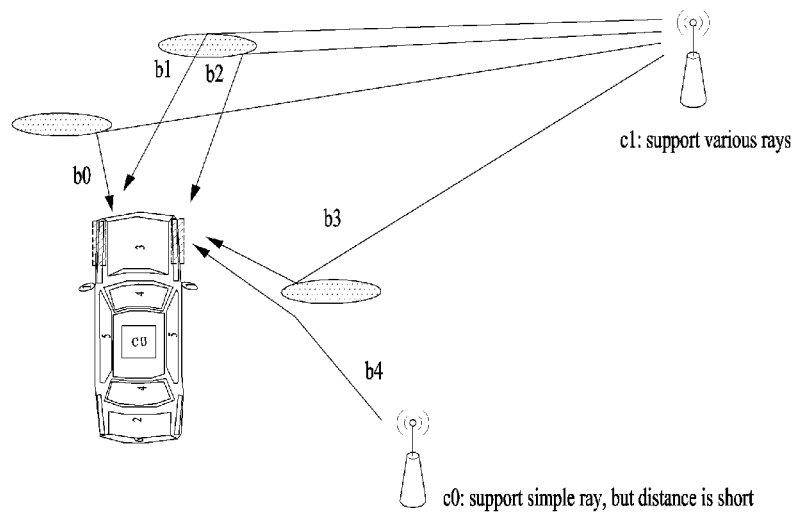
FIG. 5 illustrates problems of a conventional Rx power based cell selection method and a cell selection method proposed in an embodiment of the present invention.

FIG. 5 illustrates a problem of a conventional Rx power based cell selection method and a cell selection method proposed in an embodiment of the present invention.

In FIG. 5, although a vehicle is close to a first cell c0 and thus measures and reports high Rx power for a cell search reference signal of c0, only one ray exists between the vehicle and c0 so that link failure may occur when an object that obstructs the ray appears.

A second cell c1 a relatively longer distance from the vehicle cannot provide high Rx power to the vehicle but can support communication through various 'rays" and thus can stably secure a link even when a communication blocker appears. When the vehicle moves at a high speed, cell selection in consideration of the aforementioned "ray distribution" information needs to be performed.

Accordingly, the present invention defines a new event for determining link stability between a cell and a terminal (vehicle) in consideration of ray distribution and triggering an RRM event on the basis of the link stability. The new event defined in the present embodiment is applicable to various access controls such as cell selection, reselection, handover and neighbor cell search request.

In the following description, it is assumed that "terminal" and "UE" refer to a user device accompanying high-speed movement such as vehicles, but they are not necessarily limited to vehicles. In addition, a network device may be various devices such as an existing eNB and cell and may be a roadside unit installed on the roadside according to newly constructed infrastructure.

To calculate "ray distribution" information, it is desirable that a UE receive a cell search reference signal transmitted from a network device through multiple ports or precoded and transmitted with directivity. Accordingly, in a first aspect of the present invention, "ray distribution" information, particularly, an angle of departure (AoD) and Rx power/gain estimated when precoding/beamforming is performed can be measured through a method of determining a precoder or beamformer form suitable (preferred) to be used at a transmitter when a reference signal transmitted through multiple antenna ports is received as described above.

However, the network device may not have a plurality of transmit (Tx) antenna ports as described above. Accordingly, another aspect (second aspect) of the present invention proposes a method of measuring an angle of arrival (AoA) of a reference signal per sub-array and acquiring "ray distribution" information, particularly, information about the possibility that rays are blocked due to an obstacle close to a UE, from the AoA per sub-array when the network device transmits reference signals through a single Tx antenna.

The first aspect and the second aspect of the present invention can respectively correspond to a case using AoD and a case using AoA when "ray distribution" information is calculated depending on whether the network device uses multiple antenna ports or a single antenna port. However, the two aspects can be simultaneously generated in one communication system according to situation, and thus techniques according to the aspects described below may be combined.

Various embodiments of a UE mobility management method for efficient vehicular communication will be described in detail in terms of the aforementioned two aspects on the basis of the above description.

Embodiment 1

Embodiment 1 of the present invention proposes a method by which a UE determines link reliability per cell in consideration of AoD of rays between an eNB/cell and a sub-array and triggers an RRM event using the link reliability or feeds back related information.

In the following description, an RRM event may be as follows.

(1) A UE determines that link reliability of a serving cell is lower than an appropriate level and reports the link reliability to an eNB/cell or (2) the UE determines that there is another cell which has higher link reliability than the current serving cell and thus is more suitable as an access point The RRM event refers to a measurement parameter necessary to determine a current radio resource state or change, a process for determining that access control needs to be performed using the measurement parameter or determining that link state change needs to be reported to an eNB/cell, and a method of reporting the event or measurement parameter. In the present embodiment, a method of newly defining the event corresponding to (1) and a method of newly defining the event corresponding to (2) using the same are proposed.

When a UE reports the occurrence of a new event proposed in the present embodiment to an eNB/cell, the UE may report an indicator indicating the occurrence of the event or directly report a measurement parameter used to determine the occurrence of the event to the eNB/cell. In this case, it may be desirable to report a new parameter which is not used in conventional event reporting to the eNB/cell.

In the first aspect of the present invention, that is, when a transmitter uses multiple antennas, the aforementioned additional report parameter may take a form of AoD, precoder matrix index, AoD indicator, angular spread of transmit rays, preferred Tx beam indexes or the like.

In the second aspect of the present invention, that is, when a transmitter uses a single antenna, the aforementioned additional report parameter may take a form of AoA, AoA representative value, codebook based AoA indicator, angular spread of received rays, best N rays AoA index(es) or the like.

In addition, the parameter may include spatial characteristics between the eNB/cell and the UE, particularly, information about ray/beam directivity.

Figure 6:
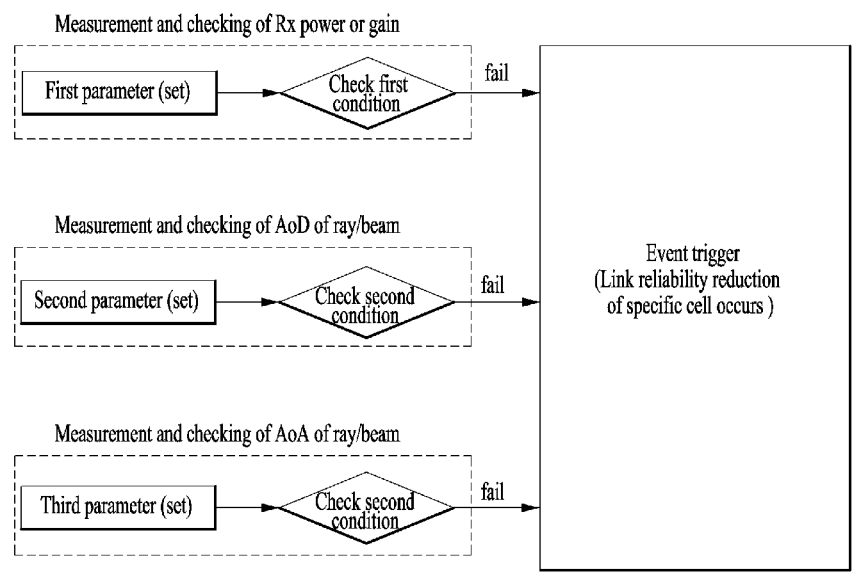
FIGS. 6 and 7 illustrate a method of triggering an event in consideration of ray diversity as proposed in an embodiment of the present invention.
Figure 7:
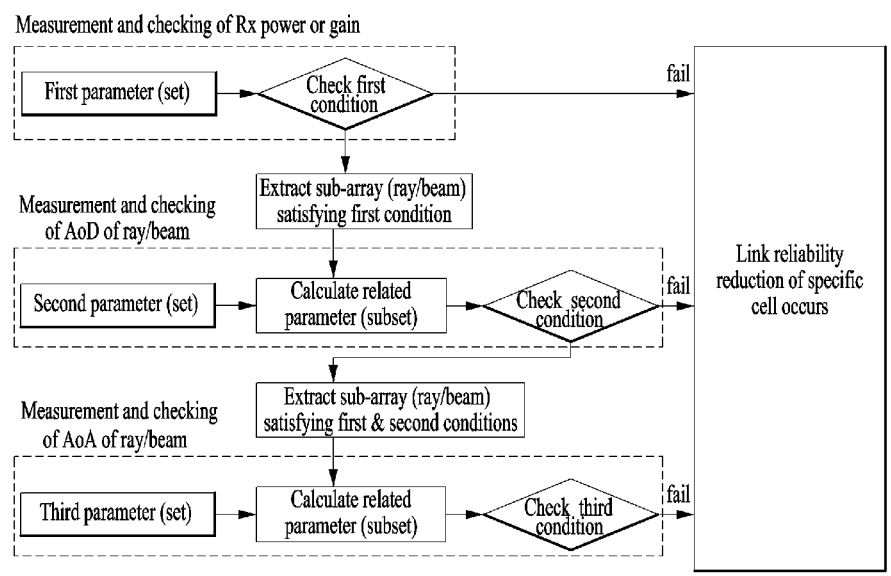
Figure 8:
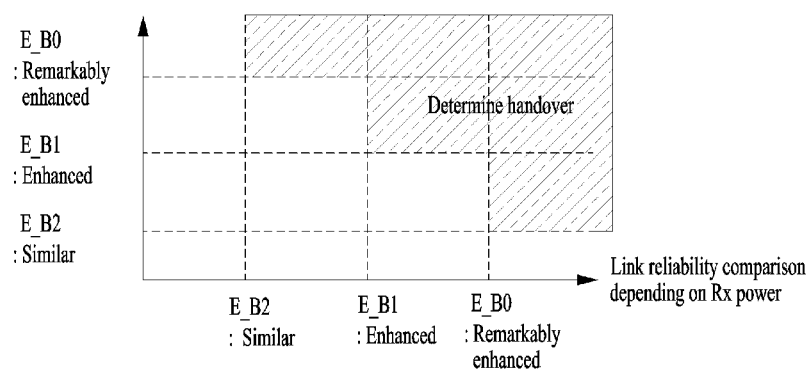
FIG. 8 illustrates a method of triggering a handover event in consideration of ray diversity.

FIGS. 6 and 7 illustrate a method of triggering an event in consideration of ray diversity as proposed in an embodiment of the present invention and FIG. 8 illustrates a method of triggering a handover event in consideration of ray diversity.

As illustrated in FIGS. 6 and 7, angle information about ray/Tx beam and information about Rx power (propagation gain and processing gain) may be independently used to determine link reliability (FIG. 6) or used to determine link reliability in consideration of correlation therebetween (FIG. 7). Details will be described through the following embodiment.

As shown in FIG. 8, whether an event is triggered can be determined through combination of measurement values of two or more parameters. Details will be described through the following embodiment.

In the first aspect of the present invention, that is, in the case of reference signal transmission through multiple antennas, a UE may perform "preferred beam searching" for a cell search reference signal upon reception of the cell search reference signal. Through this operation, the UE can 1) distinguish a ray having a higher propagation gain and a higher estimated beamforming gain than other rays from other rays and 2) acquire a transmitter precoder form suitable for downlink reception, that is, AoD information of a beam through the ray.

Figure 9:
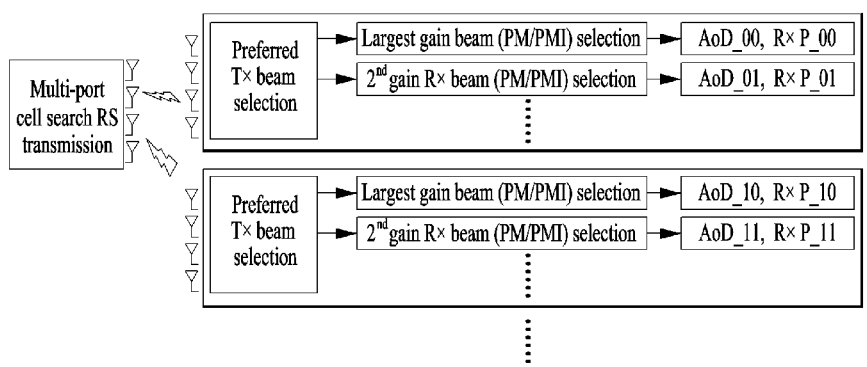
FIGS. 9 and 10 illustrate a method of selecting and processing a preferred beam for each antenna unit in an embodiment of the present invention and FIG. 11 illustrates a method of measuring RxP without considering precoding gain as in the conventional method.
Figure 10:
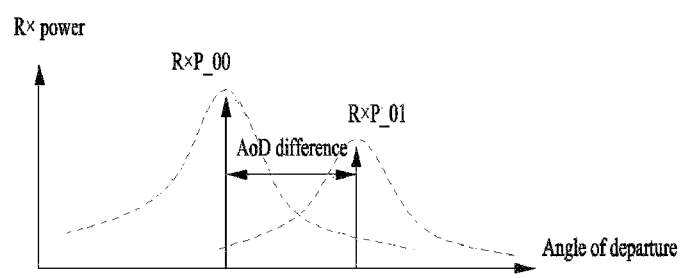
Figure 11:
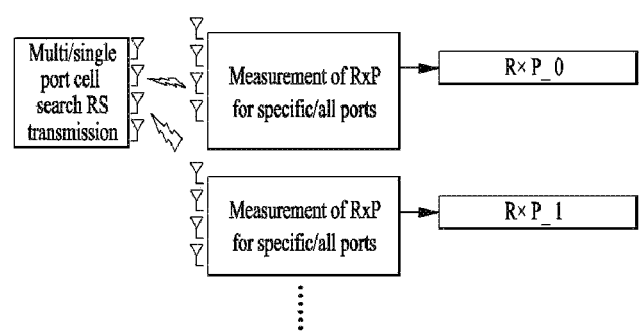

FIGS. 9 and 10 illustrate a method of selecting and processing a preferred beam for each antenna unit in an embodiment of the present invention and FIG. 11 illustrates a method of measuring RxP without considering a precoding gain as in the conventional method.

The present embodiment proposes a method of determining link reliability per cell using all or some measurement values obtained through the methods illustrated in FIGS. 9 to 11. Operation of a receiver as illustrated in FIGS. 9 and 10 will be described in more detail.

1) The receiver estimates a MIMO channel corresponding to an array or sub-array.

2) A set of Tx beams (AoD, PMI, etc.) having gains equal to or higher than a fixed value is selected from the MIMO channel estimated in process 1).

3) The Tx beam set selected in process 2) and the gain of each Tx beam are analyzed to determine link reliability of the corresponding cell/eNB.

When the number of Tx beams selected to determine link reliability in process 3) is large and a difference between AoD values of Tx beams is large, the cell/eNB can be determined to have high link reliability (e.g., c1 in FIG. 5). On the contrary, when the number of selected Tx beams is small or a difference between AoD values of the corresponding beams is not large, the cell/eNB can be determined to have low link reliability (e.g., c0 in FIG. 5).

In addition to the above-described method, when a plurality of cell search RSs is transmitted in the form of precoded RSs (beamformed RSs), Rx quality distribution for a beam index (or AoD) similar to FIGS. 9 and 10 can be measured by measuring Rx quality for each cell search RS.

In the second aspect of the present invention, that is, in the case of reference signal transmission through a single antenna, a UE measures an angle of arrival (AoA) for a cell search reference signal upon reception of the cell search reference signal. Through this operation, the UE can 1) distinguish a ray having higher propagation gain and higher estimated Rx beamforming gain than other rays from other rays and 2) acquire AoA information and estimated gain information during downlink reception through the ray.

Figure 12:
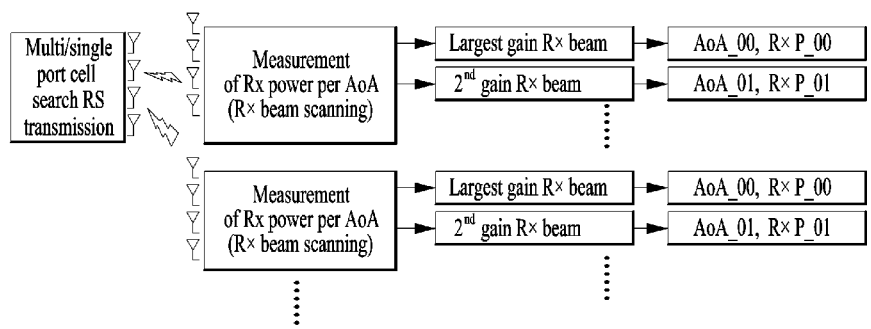
FIG. 12 illustrates a method of determining beam diversity using an angle of arrival (AoA) per antenna unit in a second aspect of the present invention.

FIG. 12 illustrates a method of determining beam diversity using AoA per antenna unit in the second aspect of the present invention.

The second aspect of the present invention proposes a method of determining link reliability per cell using all or some measurement values obtained through FIG. 11 or 12. Operation of a receiver as illustrated in FIG. 12 will be described in more detail.

1) The receiver estimates a MIMO channel corresponding to an array or sub-array.

2) A set of Rx beams (AoA) having gains equal to or higher than a fixed value is selected from the MIMO channel estimated in process 1).

3) The Rx beam set selected in process 2) and the gain of each Rx beam are analyzed to determine link reliability of the corresponding cell/eNB.

When the number of Rx beams selected to determine link reliability in process 3) is large and a difference between AoA values of Rx beams is large, the cell/eNB can be determined to have high link reliability (e.g., c1 in FIG. 5). On the contrary, when the number of selected Rx beams is small or a difference between AoA values of the corresponding beams is not large, the cell/eNB can be determined to have low link reliability (e.g., c0 in FIG. 5).

The aforementioned method is applicable to both a case in which a cell search RS is transmitted through a single port and a case in which the cell search RS is transmitted through multiple ports and can be applied irrespective of cell search RS transmission form such as transmission of multiple RSs in the form of precoded RSs (beamformed RSs). In addition, in AoA measurement, an AoA can be measured in various manners such as measurement of AoA per sub-array and measurement of AoA per RS. According to the aforementioned operation, Rx quality distribution for AoA as shown in FIG. 13 can be measured.

Figure 13:
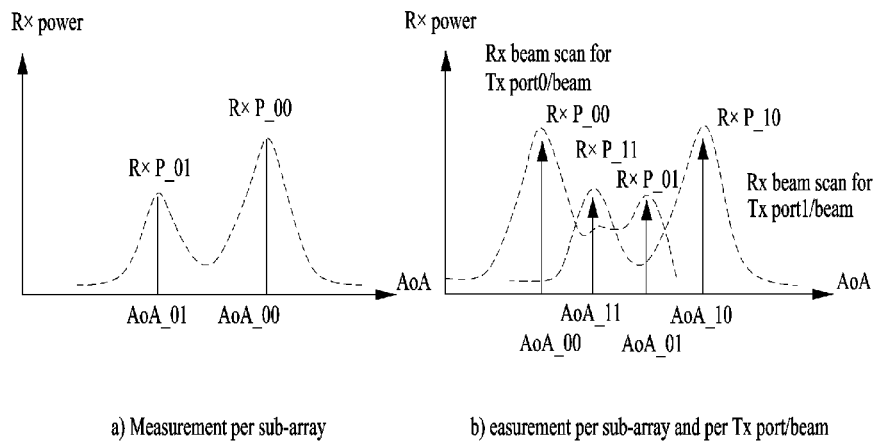
FIG. 13 illustrates a method of measuring Rx quality distribution for AoA according to the second aspect of the present invention.

FIG. 13 illustrates a method of measuring Rx quality distribution for AoA according to the second aspect of the present invention.

Specifically, FIG. 13 a) shows Rx power and AoA distribution for each of a plurality of Rx sub-arrays and FIG. 13 b) shows Rx power and AoA distribution per sub-array and per Tx port/beam.

Embodiment 2

Embodiment 2 is a sub-embodiment of the above-described embodiment 1 and proposes additional consideration of one or more of the following measurement values in determination of link reliability per cell in consideration of AoD and intensity distribution of rays between an eNB/cell and sub-arrays according to the first aspect of the present invention.

A. Rx power/quality per sub-array for each eNB/cell
B. Rx power/quality of the entire array
C. Rx power/quality of each preferred Tx beam of each sub-array
D. Rx power/quality of each preferred Tx beam of all sub-arrays In the second aspect of the present invention, "Tx beam" may be replaced by "Rx beam" in the additionally considered parameters A to D.

Example 1

Rx power and AoD with respect to a preferred Tx beam of each sub-array are considered (A and C values are used).

1) A UE calculates a sub-array which satisfies $RxP\_n > TH\_P$ among sub-arrays.

2) In the first aspect using multiple antennas, the UE calculates AoD values for L rays or beams which guarantee the largest gain for the sub-array or calculates rays or beams which satisfy gain $>TH\_P0$ among rays or beams of the sub-array. In the second aspect using a single antenna, the UE may use AoA instead of AoD.

3) A first condition of a cell which provides a stable link is defined as a condition that the number of rays/beams which satisfy the aforementioned conditions is equal to or greater than TH_N or a condition that the number of sub-arrays which satisfy the condition 1 is equal to or greater than TN_N.

4) Only for sub-arrays which satisfy the first condition (sub-arrays in which the number of rays/beams satisfying the condition 2 is equal to or greater than TH_N, or sub-arrays which satisfy the condition 1), the UE calculates AoD values or AoA values of the rays/beams. A parameter (e.g., maximum value−minimum value, or a variance of AoD/AoA values) which can indicate a distribution of the AoD or AoA values is defined, and when the parameter is equal to or greater than TH_D, it is determined that a second condition for determining a cell which provides a stable link is satisfied.

5) The UE determines a cell which satisfies the aforementioned two conditions as a cell which provides a stable link, and when a serving cell does not satisfy any one of the two conditions, determines that "link reliability reduction event" has occurred and reports occurrence of the link reliability reduction event to the eNB/cell/serving cell.

The same algorithm is applicable to a case in which there is one sub-array, that is, the entire array is implemented as a single array.

Example 2

Rx power and AoD (AoA) of the entire array are considered (B and D values are used)

1) The UE measures Rx power of a cell search reference signal for the entire array, and when the measured value is equal to or greater than TH_P, determines that the first condition for determining a cell providing a stable link is satisfied.

2) The UE calculates AoD (AoA) values for L rays or beams which guarantee the largest gain among all rays/beams or calculates rays or beams which satisfy precoded Rx power >TH_P0 among all rays/beams.

3) The UE calculates AoD (AoA) values of the calculated rays/beams. A parameter (e.g., maximum value–minimum value, or a variance of AoD (AoA) values) which can indicate a distribution of the AoD values is defined, and when the parameter is equal to or greater than TH_D, it is determined that the second condition for determining a cell which provides a stable link is satisfied.

4) The UE determines a cell which satisfies the aforementioned two conditions as a cell which provides a stable link, and when the serving cell does not satisfy any one of the two conditions, determines that "link reliability reduction event" has occurred and reports occurrence of the link reliability reduction event to the eNB/cell/serving cell.

Example 3

In the second aspect of the present invention, Rx powers and AoA distributions of different rays/beams for each sub-array are considered (C value is used)

1) Depending on RxP_nm, which is Rx power per ray/beam of each array, the UE 1-1) selects L largest gain rays/beams per sub-array, 1-2) selects L_n rays/beams per sub-array, which make a precoded RxP sum of the largest gain rays/beams per sub-array become TH_P or more, or 1-3) calculates rays/beams which satisfy RxP_nm per sub-array >TH_P.

2) The UE 2-1) calculates the number of sub-arrays which satisfy the precoded RxP sum of the L rays/beams per sub-array >TH_P0 or the number of sub-arrays which satisfy minimum precoded Rx power of the L rays/beams per sub-array >TH_P0 upon selection of the L rays/beams per sub-array according to 1-1, and then determines that the first condition for determining a cell providing a stable link is satisfied when the number of sub-arrays is equal to or greater than TH_N, 2-2) determines that the first condition for determining a cell providing a stable link is satisfied if the number sub-arrays which satisfy L_n<TH_N0 is equal to or greater than TH_N upon selection of the L_n rays/beams per sub-array according to 1-2, and 2-3) determines that the first condition for determining a cell providing a stable link is satisfied if the number sub-arrays in which the number of rays/beams per sub-array is equal to or greater than TH_N0 is equal to or greater than TH_N when 1-3 is applied.

3) When the first condition is satisfied, the UE calculates AoA values for rays/beams which correspond to the sub-arrays satisfying the first condition and are calculated for each the aforementioned cases. A parameter (e.g., maximum value–minimum value, or a variance of AoA values) which can indicate a distribution of the AoA values is defined, and when the parameter is equal to or greater than TH_A, it is determined that the second condition for determining a cell which provides a stable link is satisfied.

3-1) For example, when 1-1 and 2-1 are applied, AoA values are calculated for L rays/beams of each sub-array satisfying the condition of 2-1. A case in which 1-2 and 2-2 are applied and a case in which 1-3 and 2-3 are applied can be naturally interpreted and thus detailed description thereof is omitted.

4) The UE determines a cell which satisfies the aforementioned two conditions as a cell which provides a stable link, and when a serving cell does not satisfy any one of the two conditions, determines that "link reliability reduction event" has occurred and reports occurrence of the link reliability reduction event to the eNB/cell/serving cell.

Example 4

Power and AoD (AoA) distribution for each preferred Tx beam of the entire array are considered (D value is used)

1) The UE selects L largest gain rays/beams or calculates rays/beams which satisfy RxP_nm>TH_P depending on RxP_nm which is precoded Rx power of each ray/beam of each sub-array.

2) The UE determines that the first condition for determining a cell providing a stable link is satisfied when the precoded Rx power sum of the L rays/beams is equal to or greater than TH_P1 or the number of rays/beams which satisfy RxP_nm>TH_P0 is equal to or greater than TH_N.

3) The UE calculates AoD (AoA) values of the aforementioned rays/beams. A parameter (e.g., maximum value–minimum value, or a variance of AoD (AoA) values) which can indicate a distribution of the AoD (AoA) values is defined, and when the parameter is equal to or greater than TH_D, it is determined that the second condition for determining a cell which provides a stable link is satisfied.

4) The UE determines a cell which satisfies the aforementioned two conditions as a cell which provides a stable link, and when a serving cell does not satisfy any one of the two conditions, determines that a "link reliability reduction event" has occurred and reports occurrence of the link reliability reduction event to the eNB/cell/serving cell.

Example 5

Another method considering Rx powers and AoD (AoA) distributions of different rays/beams for the entire array (D value is used)

1) The UE arranges all rays/beams in order of RxP_nm levels. This is referred to as RxP_0, RxP_1, . . . for convenience of description.

2) The UE selects 2-1) K rays/beams which satisfy RxP_0+RxP_1_+ . . . +RxP_k>TH_P or 2-2) L largest gain rays/beams from the aforementioned rays/beams.

3) When K satisfying the condition of 2-1 is equal to or less than TH_N, the precoded Rx power sum of the L rays/beams is equal to or greater than TH_P or minimum precoded Rx power of the L rays/beams is equal to or greater than TH_P0, it is determined that the first condition for determining a cell providing a stable link is satisfied.

4) The UE calculates AoD (AoA) values for the min(K, TH_N) or L rays/beams. A parameter (e.g., maximum value–minimum value, or a variance of AoD (AoA) values) which can indicate a distribution of the AoD (AoA) values is defined, and when the parameter is equal to or greater than TH_D, it is determined that the second condition for determining a cell which provides a stable link is satisfied.

The UE determines a cell which satisfies the aforementioned two conditions as a cell which provides a stable link, and when a serving cell does not satisfy any one of the two conditions, determines that "link reliability reduction event"

has occurred and reports occurrence of the link reliability reduction event to the eNB/cell/serving cell.

Example 6

Rx powers and AoD distribution of different rays/beams for each sub-array are considered (C value is used)

1) The UE selects 1-1) L largest gain rays/beams or 1-2) L_n rays/beams per sub-array, which make a precoded RxP sum of the largest gain rays/beams per sub-array become TH_P or more, for each sub-array depending on RxP_nm which is Rx power per ray/beam of each sub-array. Otherwise, the UE calculates rays/beams which satisfy RxP_nm per sub-array >TH_P.

2) The UE 2-1) calculates the number of sub-arrays which satisfy the precoded RxP sum of the L rays/beams per sub-array >TH_P0 or the number of sub-arrays which satisfy minimum precoded Rx power of the L rays/beams per sub-array >TH_P0 upon selection of the L rays/beams per sub-array according to 1-1, and then determines that the first condition for determining a cell providing a stable link is satisfied when the number of sub-arrays is equal to or greater than TH_N, 2-2) determines that the first condition for determining a cell providing a stable link is satisfied if the number sub-arrays which satisfy L_n<TH_N0 is equal to or greater than TH_N upon selection of the L_n rays/beams per sub-array according to 1-2, and 2-3) determines that the first condition for determining a cell providing a stable link is satisfied if the number sub-arrays in which the number of rays/beams per sub-array is equal to or greater than TH_N0 is equal to or greater than TH_N when 1-3 is applied.

3) When the first condition is satisfied, the UE calculates AoD values for rays/beams which correspond to the sub-arrays satisfying the first condition and are calculated for each of the aforementioned cases. A parameter (e.g., maximum value–minimum value, or a variance of AoD values) which can indicate a distribution of the AoD values is defined, and when the parameter is equal to or greater than TH_D, it is determined that the second condition for determining a cell which provides a stable link is satisfied.

3-1) For example, when 1-1 and 2-1 are applied, AoD values are calculated for L rays/beams of each sub-array satisfying the condition of 2-1. A case in which 1-2 and 2-2 are applied and a case in which 1-3 and 2-3 are applied can be naturally interpreted and thus detailed description thereof is omitted.

4) The UE determines a cell which satisfies the aforementioned two conditions as a cell which provides a stable link, and when a serving cell does not satisfy any one of the two conditions, determines that "link reliability reduction event" has occurred and reports occurrence of the link reliability reduction event to the eNB/cell/serving cell.

Example 7

The link reliability determination methods proposed in the above-described examples are performed for a plurality of eNBs/cells and then whether an RRM event is triggered is determined on the basis of the result The above-described examples of an RRM event follow embodiment 1. Examples of applying the aforementioned methods to handover among RRM events will be described. Even when a link with a serving cell is stable and communication quality beyond requirements is guaranteed, handover may be necessary to support better services. Although a conventional method considers only Rx power of a cell search reference signal and thus can easily define a handover algorithm in a manner of selecting a cell having higher Rx power as a serving cell, a more complicated algorithm needs to be defined when both Rx power and link stability should be considered.

To this end, in determination of link reliability per eNB/cell, a UE defines a plurality of parameters indicating link reliability, determines superiority between eNBs/cells for each parameter, and then compares link reliabilities or link suitability between eNBs/cells.

FIG. 8 illustrates a case in which two parameters are used to indicate link reliability.

Embodiment 3

Both AoD and AoA of each ray are considered in definition of RRM event trigger conditions using link reliability.

Checking link reliability in consideration of AoA of Rx beams is a method of considering only some information which can be easily recognized by a UE from among information about channel directivity. If the UE has sufficient modem capability, the UE can recognize more accurate information about channels and determine link reliability with high reliability on the basis of the information.

Figure 14:
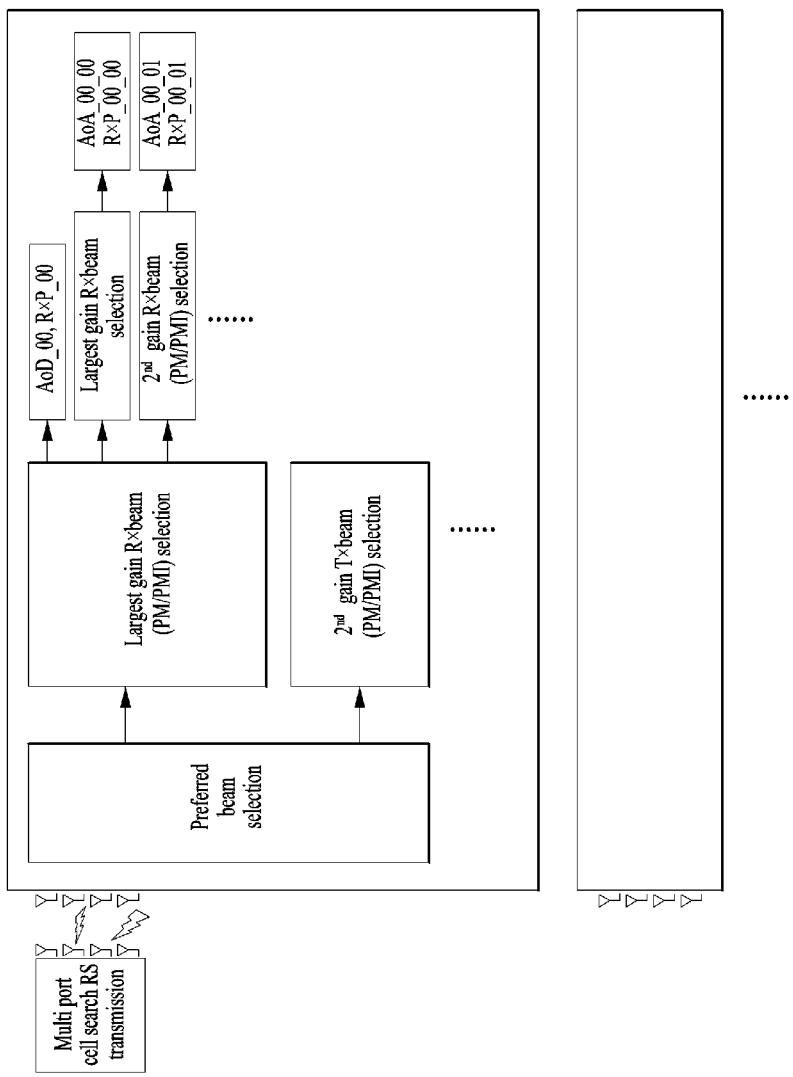
FIGS. 14 and 15 illustrate measurement examples considering both an angle of departure (AoD) and AoA per ray.
Figure 15:
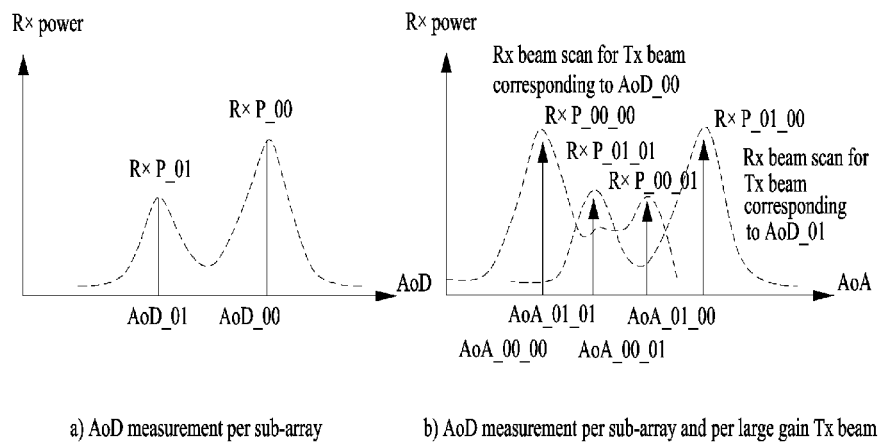

FIGS. 14 and 15 illustrate an example of measurement considering both AoD and AoA of each ray.

Tx beams or AoD which guarantee sufficient Rx power or propagation gain may be calculated and, when transmitter beamforming is performed depending on the AoD, AoA of each beam may be calculated. Here, the number of calculated Tx beams may be different for sub-arrays, UEs (vehicles) and target eNBs/cells.

Example 8

AoA per sub-array in the above-described examples is replaced by AoA per Tx beam and link reliability is determined.

Operation per "sub-array" in all examples with respect to embodiment 2 may be switched to operation per "Tx beam" and the link reliability determination process may be performed. For example, when "example 1" is switched to a method of considering AoD (AoA) per Tx beam, 1) The UE calculates Tx beams which satisfy RxP_nm>TH_P among Tx beams of each sub-array.

2) The UE calculates AoD (AoA) values for L Rx beams which guarantee the largest gain or calculates Rx beams which satisfy RxP_nm_pq>TH_P0 among Rx beams corresponding to the Tx beams, for each Tx beam.

3) The first condition of a cell which provides a stable link is defined as a condition that the number of all Rx beams which satisfy the aforementioned conditions is equal to or greater than TH_N or a condition that the number of Tx beams which satisfy condition 1 is equal to or greater than TH_N.

4) The UE calculates AoD (AoA) values of the Rx beams only for Tx beams which satisfy the first condition (Tx beams for which the number of Rx beams satisfying condition 2 is equal to or greater than TH_N or Tx beams which satisfy condition 1). A parameter (e.g., maximum value–minimum value, or a variance of AoD (AoA) values) which can indicate a distribution of the AoD (AoA) values is defined, and when the parameter is equal to or greater than TH_D, it is determined that the second condition for determining a cell which provides a stable link is satisfied.

5) The UE determines a cell which satisfies the aforementioned two conditions as a cell which provides a stable link, and when a serving cell does not satisfy any one of the two conditions, determines that a "link reliability reduction event" has occurred and reports occurrence of the link reliability reduction event to the eNB/cell/serving cell.

Example 9

In the above-described examples, after determination of a sub-condition for Rx power for the entire array or each sub-array, a sub-condition for Rx power per Tx beam of each sub-array may be determined. Then, link reliability is determined in consideration of AoD (AoA) per Rx beam.

For example, when this method is applied to example 1,
1) The UE calculates sub-arrays which satisfy $RxP\_n > TH\_P$.
1-1) The UE calculates Tx beams which satisfy $RxP\_nm > TH\_P0$ among Tx beams of each sub-array satisfying the aforementioned condition.
2) For the Tx beams per sub-array, the UE calculates AoD (AoA) values for L rays or Rx beams which guarantee the largest gain or calculates rays or Rx beams which satisfy $gain > TH\_P1$ among rays or Rx beams for the Tx beams per sub-array.
3) The first condition of a cell which provides a stable link is defined as a condition that the number of rays/Rx beams which satisfy the aforementioned conditions is equal to or greater than $TH\_N$ or a condition that the number of sub-arrays which satisfy condition 1 is equal to or greater than $TH\_N$.
3-1) Otherwise, the number of Tx beams which satisfy condition 1-1 is defined as $TH\_N0$ or more. Otherwise, a case in which two or more of the above-described three conditions are satisfied is defined.
4) The UE calculates AoA values of the aforementioned rays/Rx beams only for Tx beams which satisfy the first condition. A parameter (e.g., maximum value−minimum value, or a variance of AoD (AoA) values) which can indicate a distribution of the AoA values is defined, and when the parameter is equal to or greater than $TH\_A$, it is determined that the second condition for determining a cell which provides a stable link is satisfied.
5) The UE determines a cell which satisfies the aforementioned two conditions as a cell which provides a stable link, and when a serving cell does not satisfy any one of the two conditions, determines that a "link reliability reduction event" has occurred and reports occurrence of the link reliability reduction event to the eNB/cell/serving cell.

In the same manner, link reliability determination considering AoD (AoA) per Tx beam can be applied to the above-described examples.

Embodiment 4

Embodiment 4 of the present invention proposes a method of using sub-condition enabling/disabling signaling in definition of RRM event trigger conditions using link reliability. According to this method, an adaptive technique for executing link reliability determination and handover determination algorithms adaptively to situation can be designed in consideration of a UE movement speed, network state and the like.

Figure 16:
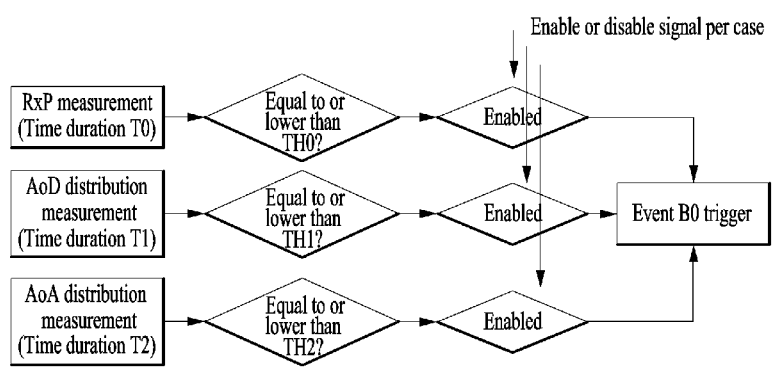
FIG. 16 illustrates a method of adjusting a link reliability determination algorithm and a handover determination algorithm adaptively to situation through enabling or disabling signaling for each sub-tree.

FIG. 16 illustrates a method of adjusting a link reliability determination algorithm and a handover determination algorithm adaptively to situation by enabling or disabling signaling per sub-tree.

In FIG. 16, an enabling/disabling signal may be information delivered from an eNB/network/cell to a UE or control information generated by the UE according to a method defined per "case" when the current communication situation is determined to correspond to a predefined "case" on the basis of the predefined "case". In addition, although an embodiment of the present invention handles a case in which an RRM event is defined by two parameters of Rx power and AoD (AoA) and a case in which two sub-conditions are defined, the sub-condition enabling/disabling signal is applicable to a case in which three or more sub-conditions are defined in addition to the cases specified in the present invention.

FIG. 16 illustrates an enabling/disabling signal per sub-condition for a case in which a sub-condition is defined for each of three measurement parameters of Rx power, AoD and AoA, that is, three sub-conditions are defined.

When the above-described proposed methods are applied, measurement duration may be differentially applied.

As another example of implementing the above-described proposal, a method of performing measurement for different time durations for respective parameters in consideration of time-varying characteristics of the parameters with respect to channel characteristics may be considered when measurement is performed. That is, when the method as illustrated in FIG. 16 is applied, different measurement durations (or time durations) are applied to respective parameters when whether a new RRM event is triggered is determined through three measurement parameters for link reliability determination, Rx, AoD and AoA, as an extension of the present invention.

In addition, when the above-described technique is applied, the following RRM measurement values may be additionally fed back.

1. The number of rays/Tx beams equal to or higher than specific quality
2. Information about ray/Tx beam distribution, such as a maximum difference and variance of AoD values of rays/Tx beams equal to or higher than specific quality
3. The number of sub-arrays having a sufficient number of rays/Tx beams equal to or higher than specific quality FIG. 17 illustrates an apparatus for performing the above-described operations.

Figure 17:
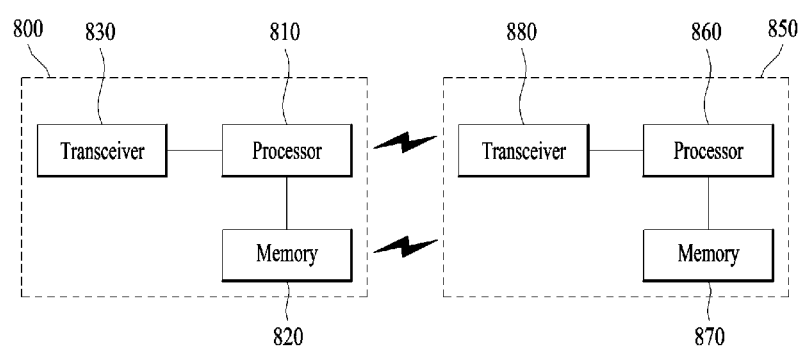
FIG. 17 illustrates an apparatus for performing the above-described operations.

A radio apparatus 800 shown in FIG. 17 may correspond to the aforementioned UE installed in a specific vehicle as described above and a radio apparatus 850 may correspond to the aforementioned network device (eNB/cell).

The UE may include a processor 810, a memory 820 and a transceiver 830 and the eNB 850 may include a processor 860, a memory 870 and a transceiver 880. The transceivers 830 and 880 transmit/receive radio signals and may be executed in the physical layer of 3GPP and the like. Particularly, the transceiver of the UE 800 in the vehicle may include a plurality of antenna sub-arrays and a central unit (CU) for controlling the antenna sub-arrays for the aforementioned distributed antenna system as illustrated in FIG. 2.

The processors 810 and 860 are executed in the physical layer and/or the MAC layer and are connected to the transceivers 830 and 880. The processors 810 and 860 may perform the aforementioned UE mobility management method. In addition, the processor of the UE 800 in the vehicle may include the CU illustrated in FIG. 2 or control the CU.

The processors 810 and 860 and/or the transceivers 830 and 880 may include a specific application-specific integrated circuit (ASIC), another chipset, a logic circuit and/or a data processor. The memories 820 and 870 may include a ROM (Read-Only Memory), a RAM (Random Access Memory), a flash memory, a memory card, a storage medium and/or another storage unit. When an embodiment is executed by software, the aforementioned methods may be executed as modules (e.g., processors or functions) which execute the aforementioned functions. The modules may be stored in the memories 820 and 870 and executed by the processors 810 and 860. The memories 820 and 870 may be provided to the inside or outside of the processors 810 and 860 or connected to the processors 810 and 860 through a known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims.

INDUSTRIAL APPLICABILITY

As described above, the present invention is applicable to various communication systems using a high-speed UE such as vehicular communication.

The invention claimed is:

1. A User Equipment (UE) for which mobility management is supported in a wireless communication system, comprising:
    antenna units; and
    a central unit connected to antenna units,
    wherein the antenna units is configured to receive signals transmitted through a single antenna of a network,
    wherein the central unit is configured to:
    determine whether a mobility related event of the UE has occurred through the signals received through the plurality of antenna units;
    determine whether the mobility related event of the UE has occurred in consideration of receive (Rx) power, angles of arrival (AoA), and angles of departure (AoD), of the signals received through the plurality of antenna units; and by setting different measurement durations for each of a plurality of respective parameters that are considered in determining whether the mobility related event has occurred.

2. The UE according to claim 1, wherein the central unit is further configured to determine link reliability with a specific network device of the network is proportional to a number of propagating beams received from the specific network device and an AoA difference between the propagating beams.

3. The UE according to claim 2, wherein the number of the propagating beams is counted except for the propagating beams having the Rx power smaller than a predetermined reference level.

4. The UE according to claim 1, wherein the Rx power of the signals received is considered through at least one of
    Rx power or quality of a signal received by each of a plurality of antenna units from each network device of the network,
    Rx power or quality of all signals received by the plurality of the antenna units from each network device of the network,
    Rx power or quality of each preferred received signal of each of plurality of the antenna units from among signals received from each network device of the network, and
    Rx power or quality of all preferred received signals of each of the plurality of the antenna units from among signals received from each network device of the network.

5. A method of performing, by a user equipment (UE), reporting for mobility management in a wireless communication system, comprising:
    receiving signals transmitted from a network;
    determining whether a mobility related event of the UE has occurred through the signals; and
    transmitting an event occurrence report to the network when the mobility related event of the UE has occurred,
    wherein whether the mobility related event of the UE has occurred is determined in consideration of receive (Rx) power, angles of arrival (AoA), and angles of departure (AoD) of the signals; and by setting different measurement durations for each of a plurality of respective parameters that are considered in determining whether the mobility related event has occurred.

6. The method according to claim 5, further comprising:
    determining link reliability with a specific network device of the network is proportional to a number of propagating beams received from the specific network device and magnitude of an AoA difference between the propagating beams.

7. The method according to claim 6, wherein the number of the propagating beams is counted except for the propagating beams having the Rx power smaller than a predetermined reference level.

8. The method according to claim 5, wherein the Rx power of the signals is considered through at least one of
    Rx power or quality of a signal received by each of a plurality of antenna units from each network device of the network,
    Rx power or quality of all signals received by the plurality of the antenna units from each network device of the network,
    Rx power or quality of each preferred received signal of each of plurality of the antenna units from among signals received from each network device of the network, and
    Rx power or quality of all preferred received signals of each of the plurality of the antenna units from among signals received from each network device of the network.

* * * * *